United States Patent
Murati et al.

(10) Patent No.: US 11,599,963 B2
(45) Date of Patent: Mar. 7, 2023

(54) PAIRING TRANSPORT SERVICE USERS AND DRIVERS USING ANIMATION

(71) Applicant: Uber Technologies, Inc., San Francisco, CA (US)

(72) Inventors: Ernel Murati, San Francisco, CA (US); Nikolaus Paul Volk, San Francisco, CA (US); Terrance Worona, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 799 days.

(21) Appl. No.: 16/237,184

(22) Filed: Dec. 31, 2018

(65) Prior Publication Data

US 2020/0098075 A1    Mar. 26, 2020

Related U.S. Application Data

(60) Provisional application No. 62/736,076, filed on Sep. 25, 2018.

(51) Int. Cl.
| | |
|---|---|
| *G06Q 50/30* | (2012.01) |
| *H04W 4/80* | (2018.01) |
| *G06K 7/14* | (2006.01) |

(52) U.S. Cl.
CPC ........... *G06Q 50/30* (2013.01); *G06K 7/1417* (2013.01); *H04W 4/80* (2018.02)

(58) Field of Classification Search
CPC ........ G06Q 50/30; G06K 7/1417; H04W 4/80
USPC ..................... 705/13, 44; 715/733
See application file for complete search history.

(56) References Cited

U.S. PATENT DOCUMENTS

| | | | |
|---|---|---|---|
| 2013/0185208 A1* | 7/2013 | Aaron .................... | G07B 15/02 705/44 |
| 2016/0332535 A1* | 11/2016 | Bradley ............... | G05D 1/0212 |
| 2016/0378303 A1* | 12/2016 | Crilley .................... | G06F 21/00 715/733 |
| 2017/0115125 A1* | 4/2017 | Outwater ............ | H04W 12/069 |
| 2019/0232860 A1* | 8/2019 | Ferrone ................ | B60Q 1/2615 |

FOREIGN PATENT DOCUMENTS

| | | | | |
|---|---|---|---|---|
| WO | WO-2013109370 A2 * | 7/2013 | ............. | G06F 21/44 |

OTHER PUBLICATIONS

Uber, Enabling Seamless Pickups through Color Coding, 2015 (Year: 2015).*
Jamers Cook, Uber is launching coloured lights so you know which car is picking you up, 2016 (Year: 2016).*

* cited by examiner

*Primary Examiner* — Tarek Elchanti
(74) *Attorney, Agent, or Firm* — Fenwick & West LLP

(57) ABSTRACT

A transport service system receives a ride request from a user device of the transport service, the ride request specifying information about a trip and selecting a direct dispatch pairing mode. The transport service system receives from the user device an input animation, the input animation acquired by the user device from a driver device. In one embodiment the input animation is a sequence of flashing colors. Based on the input animation, the transport service system identifies the driver device and transmits the received ride request to the identified driver device. The transport service system receives an acceptance from the driver device and pairs the driver device and the user device for the ride.

9 Claims, 6 Drawing Sheets

US 11,599,963 B2

PAIRING TRANSPORT SERVICE USERS AND DRIVERS USING ANIMATION

CROSS REFERENCE TO RELATED APPLICATIONS

This application claims the benefit of U.S. Provisional Application No. 62/736,076, filed Sep. 25, 2018, which is incorporated by reference in its entirety.

BACKGROUND

This disclosure relates generally to pairing transport service drivers to transport service users, and more specifically to using animation to pair transport service drivers to transport service users.

A transport service system pairs transport service drivers to transport service users upon receiving a ride request from the transport service users. The transport service system determines matches between transport service drivers and users based on a number of factors, such as the distance between the driver and user at the time of the request, the travel time between the driver and user at the time of the request, and whether the driver is currently on a trip, to reduce the average wait time between a transport service user requesting a ride and starting a trip.

However, high-density areas such as airports and stadiums often require other methods of optimization. High-density areas experience large numbers of people entering and exiting, such that the area is frequently accessed by transport service drivers for pick-ups and drop-offs. Pairing transport service drivers to users often creates a bottleneck. For example, cases may arise where a transport service user requests a ride and is paired with a transport service driver ten minutes away, while another transport service driver is present nearby for a drop-off of another trip and may be available to start a new trip shortly afterwards for the transport service user.

SUMMARY

According to described embodiments, a transport service system uses beacon animation to directly pair available transport service drivers with transport service users requesting a ride. The use of beacon animation as a unique identifier for a transport service driver enables transport service drivers and users to initiate a pairing directly and to begin a ride with minimal input from the transport service system. This allows users and drivers in high-density areas to avoid long wait times and potential bottlenecks due to high volumes of users and drivers.

A transport service user in a high-density area requests a ride via the transport service system. The ride request specifies a destination and a selection to use the direct dispatch mode. A transport service driver available to accept ride requests in the same high-density area turns on a beacon animation associated with the transport vehicle. The beacon animation (also referred to herein as a beacon signal) is an animation, signal, logo, image, or sequence of one or more characters or numbers, such as a company logo, a QR code, a sticker, or another item that can be scanned using a mobile device. The beacon animation may be displayed by a beacon device (e.g., a light-emitting signaling or display device attached to a portion of the driver's vehicle, such as one of the windows or exterior panels of the vehicle, or otherwise located inside or proximate to the vehicle). The beacon animation flashes in a sequence of repeated colors unique to the transport service provider. The transport service user scans the beacon animation using a user device. The user device transmits the beacon animation to the transport service system. Based on the sequence of colors, the transport service system identifies the transport service provider associated with the beacon animation and finalizes the ride pairing between the transport service provider and user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION (a) System Architecture

Figure 1:
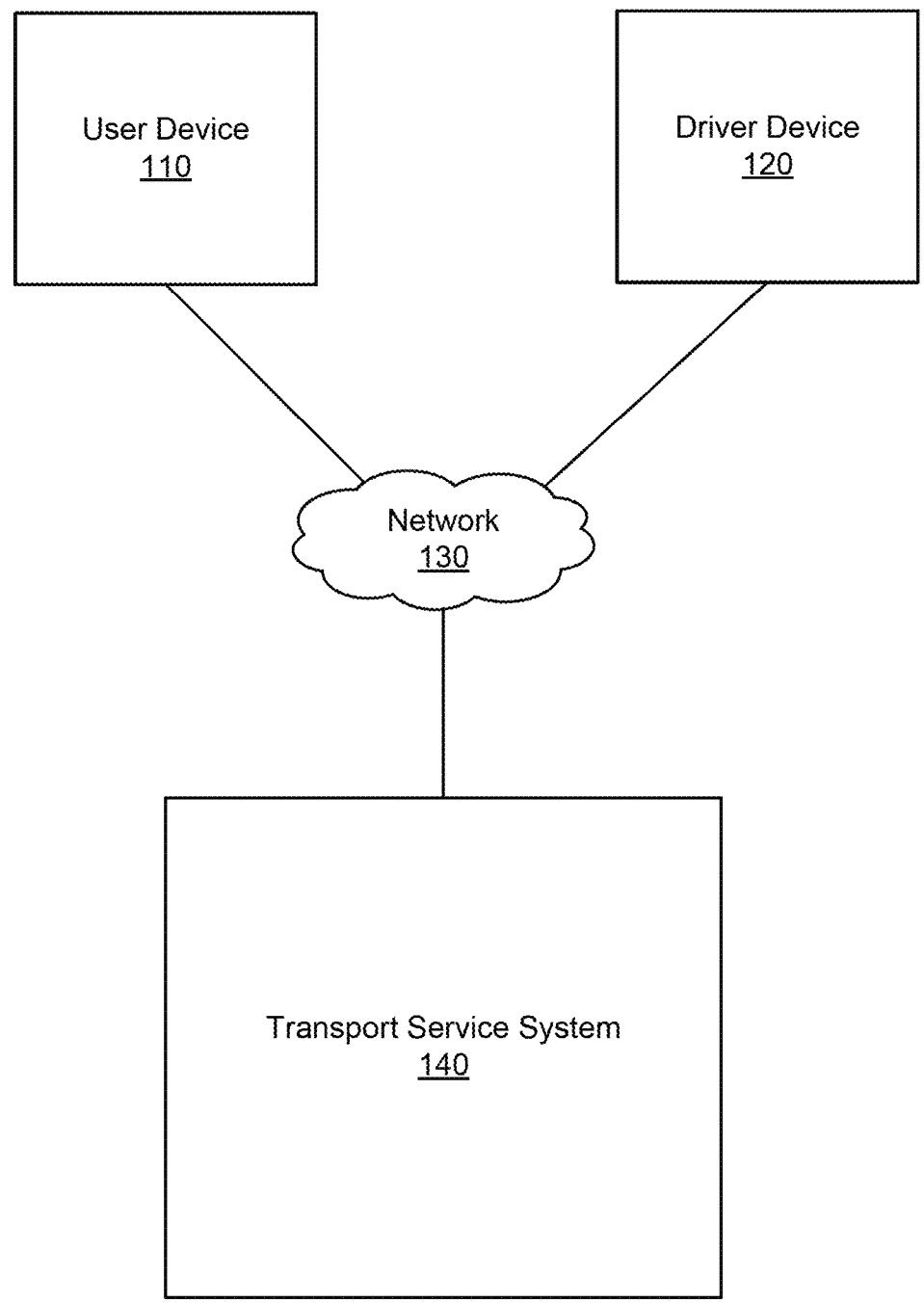
FIG. 1 is a block diagram of a system environment for a transport service system, in accordance with an embodiment.

FIG. 1 is a block diagram of a system environment for a transport service system 140, in accordance with some embodiments. FIG. 1 includes a user device 110, a driver device 120, a network 130, and the transport service system 140. For clarity, only one user device 110 and one driver device 120 is shown in FIG. 1. Alternate embodiments of the system environment can have any number of user devices 110 and driver devices 120 as well as multiple systems 140. The functions performed by the various entities of FIG. 1 may vary in different embodiments. The transport service system 140 may provide routing, direction, and timing information to the user device 110 and the driver device 120. In some embodiments, the transport service system 140 may coordinate travel, for example, by matching a rider with a driver who can transport the rider, items, or services to a destination requested by a rider.

Riders and drivers may interact with the transport service system 140 through user devices 110 and driver devices 120 respectively. User devices 110 and driver devices 120 can be personal or mobile computing devices, such as smartphones, tablets, or notebook computers. In some embodiments, the user device 110 or driver device 120 executes a client application that uses an application programming interface (API) to communicate with the transport service system 140 via the network 130.

Client devices, including user devices 110 and driver devices 120, may interact with the transport service system 140 through client applications configured to interact with the transport service system 140. Users and drivers may interact with the client applications of the client devices to request and access information about rides arranged via the transport service system 140. The client applications can present information received from the transport service system 140 on a user interface, such as a map of the geographic region, the estimated trip duration, and other information. A current location of the client device may be designated by a user or driver or detected using a location sensor of the client device (e.g., a global positioning system (GPS) receiver). The client device may provide its location as a set of coordinates, for example as provided by the location sensor on the client device.

In one embodiment, client applications provide different functionalities for user devices 110 and driver devices 120. For example, based on information received from the rider and from the transport service system 140, the user device 110 may request rides via the transport service system. In one embodiment, a ride request is associated with a destination input by the rider and an option to select a mode for pairing. For example, the rider may select a standard ride pairing method (wherein the transport service system 140 transmits the ride request to available driver devices 120) or a direct dispatch pairing method. When the direct dispatch pairing method is selected by the rider, the user device 110 generates an interface to allow the user to selectively receive input (e.g., via a camera on the user device) corresponding to a beacon animation indicating an available driver.

Driver devices 120 allow drivers of the transport service to indicate their availability to accept ride requests, interact with ride requests and ongoing ride information, and select modes of pairing for ride requests. For example, drivers that are not engaged in a current trip may use an associated driver device 120 to indicate that they are accepting ride requests from the transport service system 140. The transport service system 140 may then identify the driver device 120 as a potential pair for an incoming ride request. In another example when the driver selects a direct dispatch ride pairing mode, the driver device 120 allows a ride pairing to occur via a beacon animation associated with the driver.

In an embodiment, a driver device 120 is associated with an autonomous vehicle of the transport service system 140. For example, in some embodiments the driver device 120 is a computing system in the autonomous vehicle and does not require operation by a human driver of the transport service system 140.

Driver beacon animations may be displayed by beacon devices, and are used to identify driver devices 120 for direct dispatch pairing. In one embodiment, the beacon device is a signaling device paired to the driver device 120 via a wireless or wired connection (e.g., a light-emitting signaling or display device attached to a portion of the driver's vehicle, such as one of the windows or exterior panels of the vehicle, or otherwise located inside or proximate to the vehicle). In an embodiment, the beacon animation (also referred to herein as a beacon signal) is a signal generated by the driver device 120 that is used by the transport service system 140 as an identifier for a particular driver device 120. For example, in one embodiment, the beacon signal is a sequence of flashing colors that can be scanned using a client device camera. In other embodiments, beacon signals may be QR codes, Bluetooth or other wireless frequency signals, audio signals, ultrasounds signals, or other signals that can be detected by a user device 110. The beacon animation/signal unique to the driver device 120 is activated when a driver uses the client application to select a direct dispatch ride pairing mode, allowing a rider to scan the beacon animation/signal for use as an identifier via the transport service system 140.

The user devices 110 and driver devices 120 can communicate with the transport service system 140 via the network 130, which may comprise any combination of local area and wide area networks employing wired or wireless communication links. In some embodiments, all or some of the communication on the network 130 may be encrypted.

Figure 2:
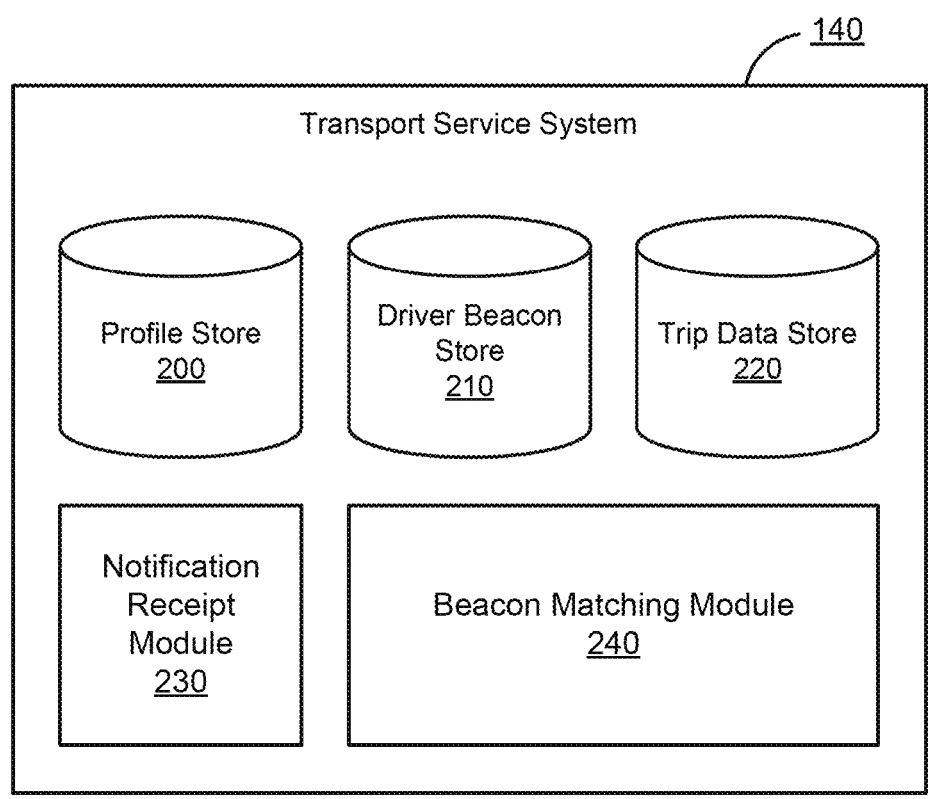
FIG. 2 is a block diagram of an architecture of the transport service system, in accordance with an embodiment.

FIG. 2 is a block diagram of a system architecture for the transport service system 140, in accordance with some embodiments. The transport service system 140 includes various modules and data stores to match users and drivers using beacon animation. The transport service system 140 comprises a profile store 200, a driver beacon store 210, a trip data store 220, a notification receipt module 230, and a beacon matching module 240. Computer components such as web servers, network interfaces, security functions, load balancers, failover servers, management and network operations consoles, and the like are not shown so as to not obscure the details of the system architecture. Additionally, the transport service system 140 may contain more, fewer, or different components than those shown in FIG. 2 and the functionality of the components as described herein may be distributed differently from the description herein.

The profile store 200 stores information about users and drivers of the transport service system 140. The information about users and drivers stored in the profile store 200 may be anonymized. The profile store 200 may store data and statistics about past trips a driver has taken, driver goals, and driver tendencies. For example, the profile store 200 may include how long a driver has been providing trips for the transport service system 140, driver ratings, data about past trips a driver has facilitated, an average number of trips provided per hour, vehicle type, usual hours of providing service, an average arrival time in relation to a predicted estimated time of arrival, whether the driver uses beacon animation for pairing, whether the driver typically follows suggested routes, a weekly earnings goal the driver has set, geographical regions most frequently visited by the driver, an average amount of time the driver is willing to wait for a new assignment, and so forth.

Data about drivers may be collected by the transport service system 140, for example, via driver interactions with applications on a driver device 120, and via user feedback about the drivers. Profile data may be used to determine a driver's probability of behaving in certain ways, for example, whether a driver is likely to follow a suggested route and whether a driver is likely to travel among different geographical regions, for example, when responding to a ride request from a user.

The driver beacon store 210 stores data related to beacon signals associated with driver devices. In one embodiment, the driver beacon store 210 contains data representing unique beacon signals for each driver of the transport service system 140. For example, the driver beacon store 210 contains data identifying unique sequences of flashing colors associated with drivers of the transport service system 140. In another example, the driver beacon store 210 contains data identifying other signals uniquely associated with drivers of the transport service system 140, such as QR codes, Bluetooth signals, and others. In one embodiment, the driver beacon store 210 may contain data identifying multiple beacon animations for a transport service driver.

The trip data store 220 stores data related to one or more past trips facilitated by the transport service system 140. Trip data may include information about one or more of an origin and a destination of a trip, a route taken between the origin and the destination, a time of the trip, and an identification of the trip driver. The trip data may also include location information gathered by the location sensor on the user device 110 or the driver device 120 during the trip. Stored trip information can also include route features such as traffic signals and road signs, an estimated trip duration generated at the time a trip was requested, and an actual trip duration. In some embodiments, the trip data store 220 stores data related to trips taken by a driver that were not requested by a user and that did not involve user transport. For example, the system may suggest routes to a provider to encourage the driver to move toward an area of high demand (e.g., an area where many users are requesting trips).

The notification receipt module 230 receives ride request information from user devices 110. The ride request includes information identifying a destination, a current location, and a pairing method specified by the user of the user device 110. In the case that the ride request specifies a standard ride pairing method, the notification receipt module 230 transmits the ride request to one or more available driver devices 120 identified by the transport service system 140 as being potential drivers for the ride. In the case that the ride request specifies a direct dispatch pairing method, the notification receipt module 230 receives beacon information from the user device 110 and transmits the beacon information to the beacon matching module 240. In both cases, a driver device 120 is identified (either by the beacon matching module 240 in the case of a direct dispatch pairing method, or otherwise by the transport service system 140 in the case of a standard ride pairing method), and the notification receipt module 230 receives the identifier of the driver device 120 selected to be paired for the ride request. The notification receipt module 230 transmits the ride request information to the identified driver device 120 and finalizes the pairing of the user and the driver upon receiving from the driver device 120 a notification of acceptance.

The beacon matching module 240 receives beacon information from the notification receipt module 230 and identifies a corresponding driver device 120 based on information stored in the driver beacon store 210. In the embodiment that the beacon information is received as a video clip containing a sequence of flashing colors, the beacon matching module 240 identifies the sequence of colors contained in the video clip. The beacon matching module 240 accesses the driver beacon store 210 and, based on the identified sequence of colors, identifies the driver device 120 corresponding to the beacon sequence. In other embodiments, the beacon matching module 240 may identify beacon information in other methods (e.g., identifying a QR code from a photograph) prior to accessing the driver beacon store 210. The beacon matching module 240 then transmits information identifying the driver device 120, such as an identifier, to the notification receipt module 230 to be used in finalizing a pairing between the identified driver device 120 and the user associated with the direct dispatch ride request.

(b) Pairing Transport Service Users and Drivers Using Beacon Animation

Figure 3:
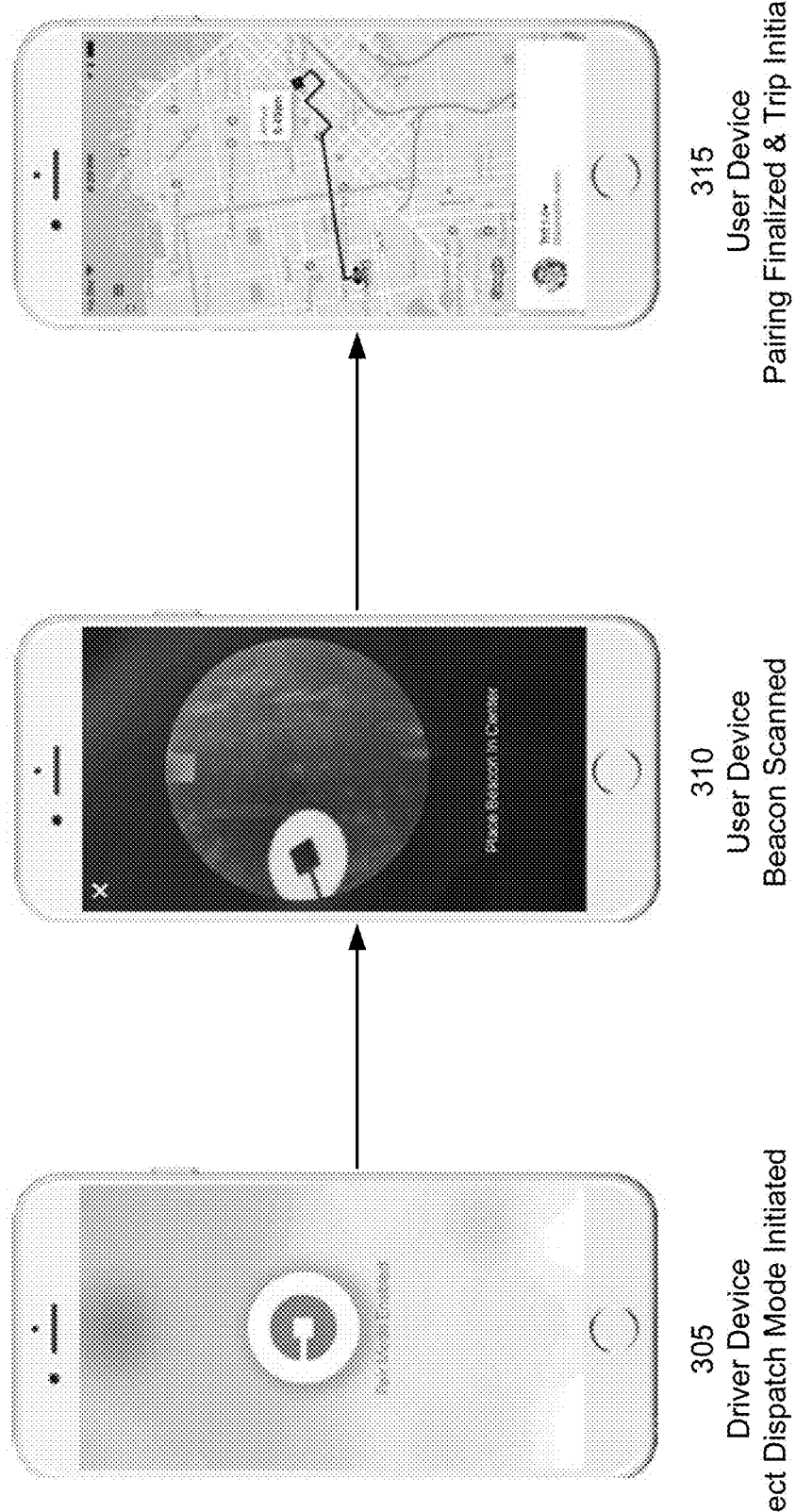
FIG. 3 is an example illustrating an interface and method for pairing transport service users and drivers using beacon animation, in accordance with an embodiment.

FIG. 3 is an example illustrating an interface and method for pairing transport service users and drivers using beacon animation. A driver of the transport service receives a notification from a user of the transport service that a direct dispatch ride is desired. In one embodiment, this notification is performed in person. For example, a rider may observe a driver who is available for a ride, and the parties may agree to initiate a direct dispatch. In other embodiments, the notification is performed via an electronic communication (e.g., by a wireless connection between the driver device 120 and user device 110). The driver of the transport service accesses the client application of the transport service system 140 and selects 305 an option to initiate a direct dispatch mode. The direct dispatch mode initiates beacon animation.

The user of the transport service uses the user device 110 to transmit a ride request to the transport service system 140. The ride request identifies a destination location and a selection to use the direct dispatch pairing method. The client application generates 310 a user interface to receive beacon animation input. For example, in the case that the beacon animation is a sequence of flashing colors, the client application interfaces with the camera of the client device 110 to scan the beacon animation. As shown in FIG. 3, the interface may additionally include instructions for the user to place the beacon animation in the center of the camera view. The beacon animation does not necessarily need to fill the camera view.

Upon scanning the beacon animation, the user device 110 transmits the beacon animation information to the transport service system 140. Based on the beacon information, the transport service system 140 identifies the driver device 120 associated with the beacon animation and transmits the ride request information, including the destination location, to the identified driver device. The driver of the transport service then selects an acceptance of the ride request. The notification of acceptance is transmitted to the transport service system 140 to finalize the pairing between the user and the driver for the ride. As shown in FIG. 3, the client application of the user device 110 displays 315 the finalized pairing and initiates the ride.

Figure 4:
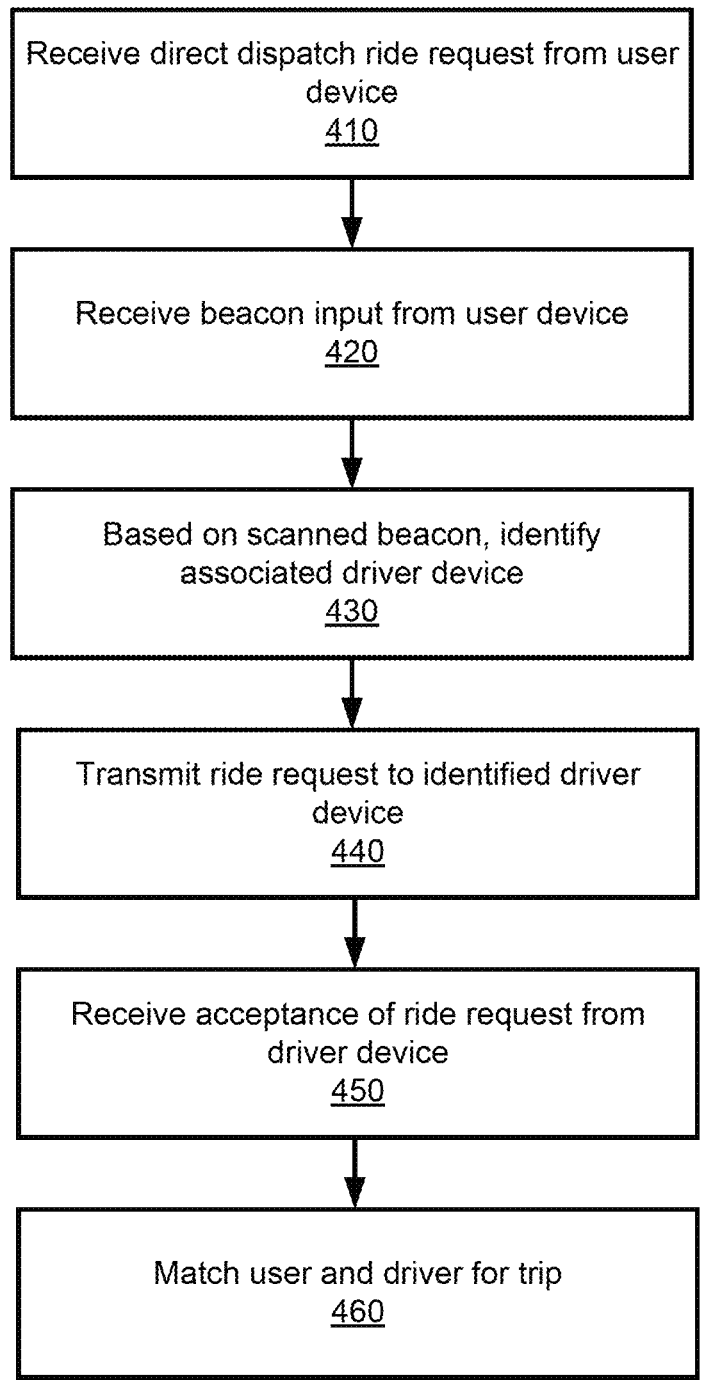
FIG. 4 is a flow diagram of a method pairing transport service users and drivers using beacon animation, in accordance with an embodiment.

FIG. 4 is a flow diagram of a method pairing transport service users and drivers using beacon animation. In various embodiments, the method may include different and/or additional steps than those described in conjunction with FIG. 4.

A transport service system 140 receives 410 a direct dispatch ride request from a user device 110. The direct dispatch ride request is associated with a request to be transported to a destination. The transport service system 140 receives 420 a beacon input (e.g., beacon animation) from the user device 110. In one embodiment, the beacon input is a sequence of flashing colors scanned by the user device 110. In other embodiments, the beacon input may be a different signal, such as a QR code or a Bluetooth signal. Based on the scanned beacon input, the transport service system 140 identifies 430 a driver device 120 associated with the beacon input and transmits 440 the ride request to the identified driver device. The transport service system 140 receives 450 acceptance of the ride request from the driver device 120 and matches 460 the user and the driver for the trip associated with the ride request.

In various embodiments, the driver device 120 is associated with an autonomous vehicle of the transport service system 140. For example, in some embodiments the driver device 120 is a computing device 120 in an autonomous vehicle. In these embodiments, the transport service system 140 receives 410 a direct dispatch ride request from a user device 110 associated with a destination and a beacon input from the user device. In one example, the autonomous vehicle automatically displays the beacon animation when the autonomous vehicle is not taking part in an ongoing ride. In another example, the autonomous vehicle displays the beacon animation responsive to an interaction by a potential rider (e.g., after determining that the potential rider has pressed a button or provided some other type of input or signal via user device 110, or after detecting that the potential rider is located proximate to the autonomous vehicle, or has approached the autonomous vehicle, or has performed some type of physical or auditory gesture or signal near the autonomous vehicle). Based on the beacon input from the user device 110, the transport service system 140 identifies a computing device 120 and corresponding autonomous vehicle associated with the beacon input and transmits the ride request information to the identified computing device 120. The transport service system 140 matches the user and corresponding autonomous vehicle for the trip associated with the ride request.

Figure 5:
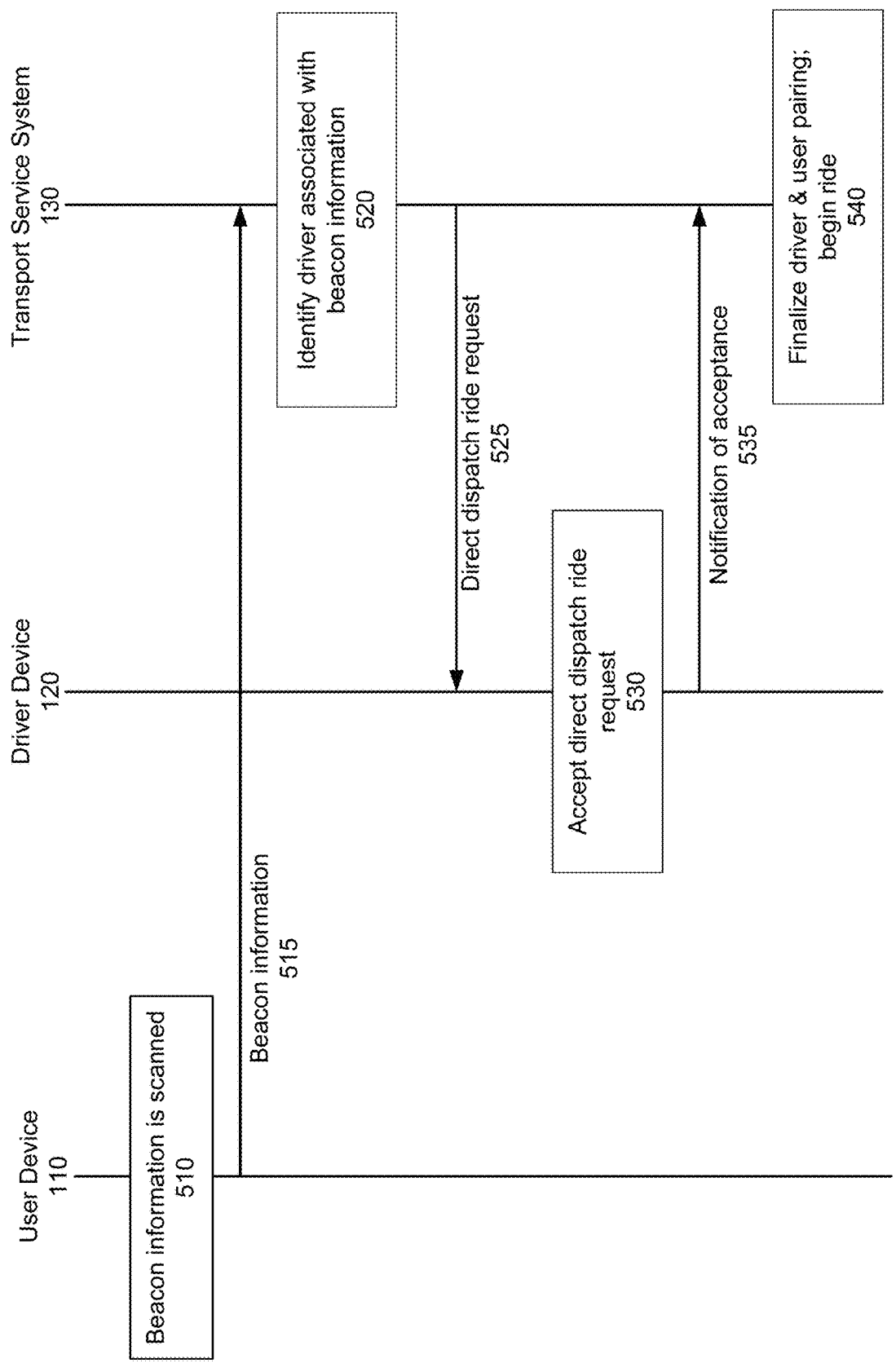
FIG. 5 is a transaction diagram illustrating example transactions between a user device, a driver device, and a transport service system, in accordance with an embodiment.

FIG. 5 is a transaction diagram illustrating example transactions between a user device, a driver device, and a transport service system, in accordance with an embodiment.

A transport service rider using a user device 110 scans 510 beacon information (e.g., a beacon animation) associated with a transport service driver available for direct dispatch pairing and transmits 515 the scanned beacon information to the transport service system 130. Based on the received beacon information, the transport service system 130 identifies 520 a driver. The transport service system transmits 525 a direct dispatch ride request to the driver device 120 associated with the identified driver. The driver device 120 accepts 530 the direct dispatch ride request and transmits 535 the notification of acceptance to the transport service system 130. The transport service system 130 then finalizes 540 the driver and rider pairing and begins the trip.

In an embodiment, the transport service rider submits trip information associated with the direct dispatch ride request to the transport service system 130 prior to or simultaneous with the beacon information being transmitted to the transport service system. For example, trip information includes a destination address and payment information. The transport service system 130 transmits the trip information to the driver device 120 in conjunction with the direct dispatch ride request. Responsive to the direct dispatch ride request, including the trip information, being accepted by the driver on the driver device 120, the transport service system 130 finalizes the pairing between the driver and rider and initiates the trip.

In one embodiment wherein the transport service rider submits trip information associated with the direct dispatch ride request prior to a pairing being finalized, the transport service system 130 determines whether the rider is authorized to participate in a direct dispatch transport service. For example, the transport service system 130 identifies a current location for the user device 110 to determine whether the rider is in a geographic location authorized for direct dispatch transport service. In another example, the transport service system 130 identifies a timestamp associated with the direct dispatch ride request to determine whether the direct dispatch transport service is available for the time. In other examples, other conditions may be used to determine whether the rider is authorized to participate in a direct dispatch transport service, including rider or driver identifiers or flags, historic usage of the direct dispatch transport service, and the like. Responsive to the transport service system 130 determining that the rider is authorized, the pairing process proceeds as described above.

In an alternate embodiment, responsive to the driver and rider pairing being finalized, the transport service rider uses the user device 110 to submit additional information about the direct dispatch ride request to the transport service system 130. The transport service system 130 transmits the additional information to the driver device 120 to begin the trip after the driver and rider pairing is finalized.

(c) Example Computer System

Figure 6:
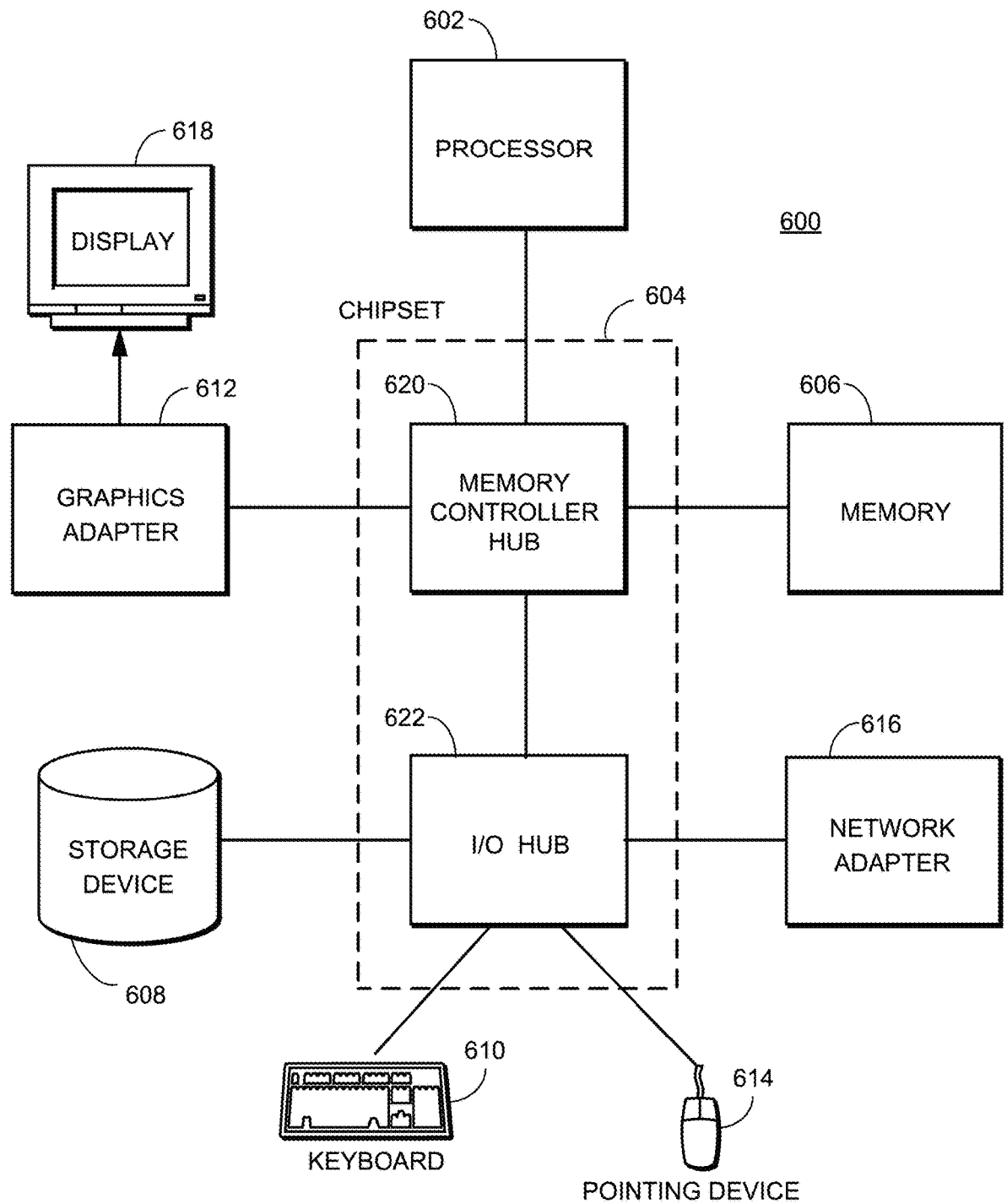
FIG. 6 is a block diagram illustrating physical components of a computer used as part or all of one or more of the entities described herein in one embodiment.

FIG. 6 is block diagram illustrating physical components of a computer 600 used as part or all of one or more of the computing systems described herein in one embodiment. For example, instances of the illustrated computer 600 may be used as a server operating the transport service system 140. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O hub 622. In another embodiment, the memory 606 is coupled directly to the processor 602 instead of the chipset 604. In one embodiment, one or more sound devices (e.g., a loudspeaker, audio driver, etc.) is coupled to chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer 600. The graphics adapter 612 displays images and other information on the display 618. The network adapter 616 couples the computer system 600 to a local or wide area network.

As is known in the art, a computer 600 can have different and/or other components than those shown in FIG. 6. In addition, the computer 600 can lack certain illustrated components. In one embodiment, a computer 600 acting as a server may lack a keyboard 610, pointing device 614, graphics adapter 612, and/or display 618. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

(d) Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method performed by a transport service system, the method comprising:
    receiving at least one of a current location and a timestamp associated with a user device;
    determining, based on the at least one of the current location and the timestamp, that the user device is authorized for a direct dispatch transport service;
    transmitting information indicating that the user device is authorized for the direct dispatch transport service based on the determination;
    receiving, from the user device, beacon animation information acquired by the user device by scanning with a camera of the user device a beacon animation displayed on a beacon device attached to an interior or exterior of a vehicle;
    accessing a driver beacon store that associates a plurality of beacon animations with respective beacon devices and corresponding driver devices of the transport service system;
    identifying a driver device associated with the received beacon animation based on the associations in the driver beacon store;
    transmitting a direct dispatch ride request to the identified driver device; and
    responsive to receiving a notification of acceptance of the direct dispatch ride request from the driver device, matching the driver device and the user device for a trip specified in the direct dispatch ride request to reduce a wait time between submission of the ride request and a beginning of the trip.

2. The method of claim 1, wherein the beacon animation is an animated sequence of colors, a QR code, or sticker.

3. The method of claim 1, wherein the beacon animation is visual or video data comprising a sequence of flashing colors emitted by the beacon device and scanned by the camera of the user device.

4. The method of claim 1, wherein the vehicle is an autonomous vehicle.

5. The method of claim 1, wherein the direct dispatch ride request specifies information including the current location associated with a user of the user device and a destination location.

6. A non-transitory computer-readable storage medium storing computer program instructions executable by one or more processors of a transport service system to perform operations comprising:
    receiving at least one of a current location and a timestamp associated with a user device;
    determining, based on the at least one of the current location and the timestamp, that the user device is authorized for a direct dispatch transport service;
    transmitting information indicating that the user device is authorized for the direct dispatch transport service based on the determination;
    receiving, from the user device, beacon animation information acquired by the user device by scanning with a camera of the user device a beacon animation displayed on a beacon device attached to an interior or exterior of a vehicle;
    accessing a driver beacon store that associates a plurality of beacon animations with respective beacon devices and corresponding driver devices of the transport service system;
    identifying a driver device associated with the received beacon animation based on the associations in the driver beacon store;
    transmitting a direct dispatch ride request to the identified driver device; and
    responsive to receiving a notification of acceptance of the direct dispatch ride request from the driver device, matching the driver device and the user device for a trip specified in the direct dispatch ride request to reduce a wait time between submission of the ride request and a beginning of the trip.

7. The computer-readable storage medium of claim 6, wherein the beacon animation is an animated sequence of colors, a QR code, or sticker.

8. The computer-readable storage medium of claim 6, wherein the beacon animation is visual or video data comprising a sequence of flashing colors emitted by the beacon device and scanned by the camera of the user device.

9. The computer-readable storage medium of claim 6, wherein the direct dispatch ride request specifies information including the current location associated with a user of the user device and a destination location.

* * * * *

UNITED STATES PATENT AND TRADEMARK OFFICE
CERTIFICATE OF CORRECTION

PATENT NO. : 11,599,963 B2
APPLICATION NO. : 16/237184
DATED : March 7, 2023
INVENTOR(S) : Murati et al.

It is certified that error appears in the above-identified patent and that said Letters Patent is hereby corrected as shown below:

On the Title Page

Item (57), in Column 2, under "Abstract", Line 7, delete "embodiment" and insert -- embodiment, --, therefor.

Signed and Sealed this
Eleventh Day of July, 2023

Katherine Kelly Vidal
*Director of the United States Patent and Trademark Office*